Patented May 4, 1943

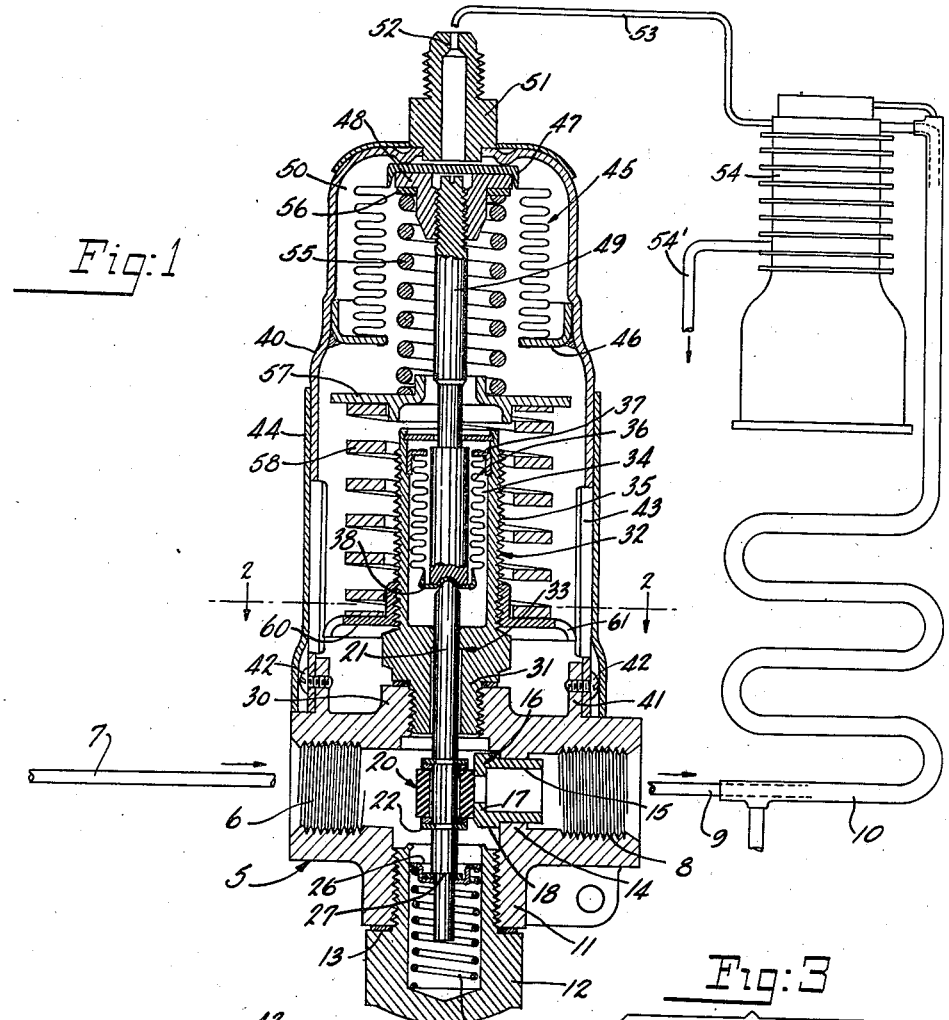
Fig:1
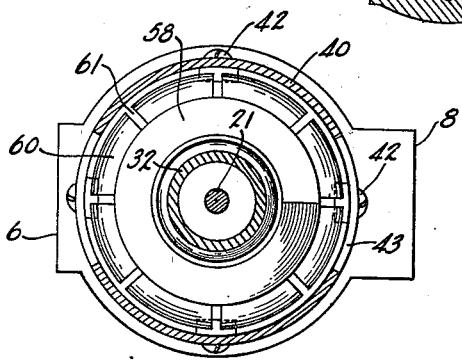
Fig:2
Fig:3
INVENTORS:-
Roy W. Johnson
Cedric E. Zerwell
John W. Michael
ATTORNEY.

2,318,161

UNITED STATES PATENT OFFICE 2,318,161

WATER REGULATING VALVE

Roy W. Johnson and Cedric E. Zarwell, Milwaukee, Wis., assignor to Automatic Products Company, Milwaukee, Wis., a corporation of Wisconsin Application July 22, 1940, Serial No. 346,750

1 Claim. (Cl. 137—153)

This invention relates to a water regulating valve especially designed and adapted to regulate the flow of water to water-cooled compressors and condensers.

One of the objects of the invention is to obtain a modulated water flow which increases the efficiency of both the water-cooled compressor and the evaporator. Water continues to flow through the valve as long as there is a tendency for an increase of pressure in the system. When the discharge pressure decreases beyond a certain point, as when the compressor stops, the valve closes, thus conserving the water when not needed.

Among other objects of the invention are to provide a special valve action wherein a molded composition valve block slides across a polished, mirror-smooth stainless steel valve seat with a long stroke to give extremely close and uniform control and to provide a structure which will show no signs of wear even after having been in use over a long period of time. As the valve is of the self-cleaning type, it is not necessary to provide a strainer, and it is hardly ever necessary to replace the valve, or its stem or seat, but provision is made for easy access, in the field, to these valve parts, and for their convenient removal and replacement, if ever the necessity therefor arises, and this, without removing the valve from the line, but merely by taking off the removable valve plug provided on the lower part of the valve body.

In carrying out the present invention, the water regulating valve regulates the flow of water to water-cooled compressors and condensers by means of head or receiver pressure which actuates a heavy duty two-ply bellows in the top of the valve. The bellows, under the influence of the pressure thereon, acts, through a special motion transmission means, and against an adjustable spring, to slide the valve toward open position. When the pressure on the bellows decreases, the action is reversed and the valve returns to closed position under the influence of its own biasing spring. The adjustment provided for the bellows spring includes a factory adjustment to determine the pressure range throughout which the valve may be operated and a field adjustment to select the particular pressure within the range at which the valve will open. The motion transmission means between the bellows and the valve includes a bellows seal for the stem of the valve.

Another important feature of the invention resides in the provision of a special bellows pressure inlet orifice to prevent compressor pulsations from affecting the valve operation and to assure steady water flow. Chattering, water hammering, and other noises are eliminated.

Other objects and advantages reside in certain novel features of the construction, arrangement, and combination of parts, which will be hereinafter more fully described and particularly pointed out in the appended claim, reference being had to the accompanying drawing forming part of this specification, and in which:

Figure 1 is a view partly in diametrical vertical cross-section, partly in elevation, and partly diagrammatic, illustrating a water regulating valve constructed in accordance with the present invention and showing one way in which it may be installed in the system;

Figure 2 is a view in horizontal cross-section, taken on line 2—2 of Figure 1, and Fig. 3 is a group view in perspective, showing in detail the valve and its stem, and also the valve seat.

Referring to the drawing, the numeral 5 designates the casing or body of the valve which may be a brass forging and which is provided with an inlet 6 adapted to be connected to a water supply line 7 and with an outlet 8 adapted to be connected with the pipe-line 9 leading to the water-cooled condenser 10. The inlet 6 and outlet 8 are preferably coaxial, one being disposed on one side and the other on the other side of the valve body to provide a direct flow construction which minimizes pressure losses. The lower portion of the valve body in between the inlet 6 and outlet 8 is provided with an internally threaded opening 11 adapted to normally be closed by a removable plug 12. When the plug is in position it hermetically seals the opening 11 due to the provision of a suitable packing washer 13.

Adjacent the outlet 8 the valve body has an internally inwardly directed annular shoulder or ported partition in which the sleeve-like body portion 15 of a valve seat designated generally at 16 is press fitted or otherwise suitably secured. At one end the body portion 15 of the valve seat is provided with an integral end wall 17 having a central port of rectangular form and coaxially disposed with respect to the inlet 6 and outlet 8. The end wall 17 has a peripheral flange 18, the lower portion of which is beveled as shown. The valve seat is preferably constituted of stainless steel and the exposed face of its end wall 17 is polished or finished to a mirror-smooth surface. A valve block 20 is slidable across the smooth exposed face of the upper end wall 17 of the valve seat. Preferably the valve block is constituted of molded composition material such as "Bakelite." It is generally rectangular in form and has an opening therethrough to accommodate a portion of the valve stem 21. This opening has a larger diameter than the diameter of the stem 21 so that the valve block 20 has free lateral movement with respect to the stem 21. Thus the valve block 20 is held against the face 17 only by the pressure of the fluid and any binding due to manufacturing inaccuracies is eliminated. Collars or shoulders 22 on the valve stem (one of which may be a washer and a snap C-ring) constrain the valve block 20 to move axially with the valve stem 21. The height of the rectangular port is sufficient to cause the valve block 20 and stem 21 to move a substantial distance to fully open the valve.

The valve 20 is biased to closed position by means of a valve spring 25 having its lower end abutting the plug 12 and having its upper end abutting a spring cup or seat 26 connected with the valve stem in that its apertured central portion bears against a shoulder 27 formed on the valve stem.

The top of the valve body 5 is also provided with an internally threaded and flanged opening 30. The reduced and externally threaded lower end 31 of a sealing bellows housing 32 is threaded into the opening 30. The lower portion of the housing 32 has an axial guiding opening 33 therein through which the upper portion of valve stem 21 freely slides. Above the opening 33 the internal diameter of the housing 32 is enlarged to provide a bellows receiving chamber 34 and such portion of the housing 32 is also externally threaded as at 35 for a purpose which will hereinafter more clearly appear.

The bellows chamber 34 is sealed by means of a sealing bellows 36 having its upper end mechanically connected and hermetically sealed to the upper end portion of the inside of the bellows chamber 34 as indicated at 37. The lower end of the bellows 36 is closed by an end wall 38 which has a downwardly facing socket at its center interfitting with the correspondingly formed upper end of the valve stem 21. By bellows-sealing the valve stem in this way, it may be packless and may be conveniently constituted of brass.

The bellows chamber 34 can be made to act like a dash pot if the fit between the opening 33 and the stem 21 is maintained at as close tolerances as is consistent with the free sliding of the stem. Any movement of the bellows 36 and stem 21 will cause either an increase or decrease of the volume of chamber 34 and a resulting flow of fluid through the limited space between the opening 33 and stem 21. Thus the chamber 34 also functions as a dash pot to dampen the movement of the end wall 38 of the bellows 37 and stem 21 which prevents chattering and vibratory movement of the valve block 20.

A bonnet-like cover 40 is provided for the bellows chamber and for the parts associated therewith. This cover is of tubular form and has its lower open end fitted over and releasably attached by screws 42 to lugs 41 integral with the valve body 5. The cover 40 is provided with large openings 43 to facilitate access to the parts therewithin. The openings 43 are normally closed by means of a removable sleeve 44.

Within the upper portion of the tubular cover 40 is a heavy duty two-ply copper bellows 45 which constitutes the power element of the valve. The lower end of this bellows 45 is connected and sealed to a supporting ring 46 welded or otherwise suitably secured to the cover and of angular cross-section as shown in Figure 1. The upper end of the bellows 45 is connected and sealed to a pressure pad 47. The pressure pad 47 rests on an adjusting nut 48 threadedly interconnected with the upper end of an operating pin 49. The adjustment of the nut 48 on the pin 49 is made at the factory to determine the pressure range of the valve and is solder-sealed. The operating pin 49 extends down into the sealing bellows 36 and has its lower end provided with a concave recess to interfit with the correspondingly formed socket structure on the lower end wall 38 of the bellows which is in driving connection with the valve stem 21.

The operating or power bellows 45 coacts with the upper portion of the cover 40 to define a pressure chamber 50. Pressure is supplied to this chamber 50 through a fitting 51 suitably interconnected with the upper end of the cover and having a restricted inlet orifice 52 adapted to be connected by means of high pressure line 53 with the high pressure side of the system. By virtue of the provision of the restricted inlet orifice to the pressure chamber or bellows chamber 50, compressor pulsations affecting the action of the bellows 45 are minimized. In the drawing, the compressor is illustrated diagrammatically at 54 and the outlet hose connection at 54¹.

Adjustable spring means is provided for opposing action of the power bellows 45 under the influence of the head pressure to determine the pressure range of the valve and also its opening point when installed. In the construction illustrated in the drawings, this adjustable spring means comprises a coil spring 55 having its upper end engaged with a washer 56 abutting the flange of the nut 48 and having its lower end engaging a spring cup 57. The spring cup is interfitted with the upper end of a second flat coil spring 58 which loosely encircles the bellows chamber and bears at its lower end on the outwardly directed horizontal flange of an adjusting nut 60. The hub flange of this nut 60 is internally threaded and its threads are engaged with the external threads of the sealing bellows housing 32. The periphery of the horizontal flange of the adjusting nut 60 is notched as at 61 so as to facilitate adjustment thereof through the openings 43. The adjustment of the nut 48 is made at the factory to determine the pressure range, and after the valve has been tested it is solder-sealed. The nut 60 is adjusted in the field to determine the opening point of the valve. The valve should be set to open at a definite head pressure depending upon the temperature of the water and the kind of refrigerant used, and the nut 60 provides a convenient means of effecting this in the structure shown.

It has been found that if the rectangular port has substantial height, the valve stem 21, operating pin 49 and bellows 45 will have to have a long stroke to effect a complete opening of the valve. This long stroke makes the power element more sensitive in its operation of the valve and hence the control can be close and uniform. A height of the port which is approximately 18% of the permissible extended height of the power element has been found satisfactory. Of course, this may be varied, the essence of this feature being a height sufficient to require substantial movement by the power bellows to open the valve.

By using two springs of the structure shown, the height of the valve may be kept within practical limits, the desirable high spring rate may be had without overstressing the springs and a soft spring cooperable with nut 60 is usable.

While we have shown and described one construction in which the invention may be advantageously embodied, it is to be understood that the construction shown has been selected merely for the purpose of illustration or example and that various changes in the size, shape, and arrangement of the parts may be made without departing from the spirit of the invention or the scope of the subjoined claim.

We claim:

A water regulating valve for controlling the flow of water to water-cooled compressors or condensers of refrigerating systems and comprising a valve body having an inlet and an outlet, a ported partition in said valve body interposed between the inlet and the outlet and having a valve seat provided with a flat valve face, a valve block slidable across the face of said seat to regulate flow through said ported partition, a valve stem with which said valve block is constrained to slide, a sealing bellows housing mounted on the valve body and having a guide opening through which the valve stem slides, a sealing bellows having one end hermetically sealed to said housing and having its other end closed and in driving engagement with the valve stem, a cover for the housing, a power bellows interconnected with the cover to define a pressure chamber, means connecting said pressure chamber with the high pressure side of the system, an adjusting nut engaged with said power bellows, an operating pin threadedly interconnected with the adjusting nut and in driving engagement with the portion of the sealing bellows engaged with the valve stem, a spring arrangement abutting the adjusting nut at one end and a second adjusting nut for said spring arrangement threaded on the housing.

ROY W. JOHNSON.
CEDRIC E. ZARWELL.